United States Patent
Hwang (10) Patent No.: US 7,596,704 B2
(45) Date of Patent: Sep. 29, 2009

(54) PARTITION AND RECOVERY OF A VERIFIABLE DIGITAL SECRET

(76) Inventor: Jing-Jang Hwang, 7F, No. 121, Chang Gung Medical Village, Kwei-Shan, Tao-Yuan (TW)

(*) Notice: Subject to any disclaimer, the term of this patent is extended or adjusted under 35 U.S.C. 154(b) by 928 days.

(21) Appl. No.: 10/960,714

(22) Filed: Oct. 6, 2004

(65) Prior Publication Data

US 2005/0081041 A1   Apr. 14, 2005

Related U.S. Application Data

(60) Provisional application No. 60/510,443, filed on Oct. 10, 2003.

(51) Int. Cl.
*G06F 12/14* (2006.01)
(52) U.S. Cl. .................... 713/193; 713/184
(58) Field of Classification Search ............ 713/193, 713/184
See application file for complete search history.

(56) References Cited

U.S. PATENT DOCUMENTS

| | | | |
|---|---|---|---|
| 5,208,853 | A | 5/1993 | Armbruster et al. |
| 5,241,599 | A | 8/1993 | Bellovin et al. |
| 5,440,635 | A | 8/1995 | Bellovin et al. |
| 5,535,276 | A | 7/1996 | Ganesan |
| 5,721,779 | A * | 2/1998 | Funk .................. 713/155 |
| 5,905,799 | A | 5/1999 | Ganesan |
| 6,170,058 | B1 | 1/2001 | Kausik |
| 6,457,127 | B1 | 9/2002 | Staring |
| 6,662,299 | B1 * | 12/2003 | Price, III .............. 713/171 |
| 6,904,493 | B2 * | 6/2005 | Chiao et al. ........... 711/103 |
| 2001/0002486 | A1 | 5/2001 | Kocher et al. |
| 2001/0055388 | A1 | 12/2001 | Kaliski |
| 2001/0056541 | A1 | 12/2001 | Matsuzaki et al. |
| 2002/0071566 | A1 | 6/2002 | Kurn |
| 2002/0078344 | A1 | 6/2002 | Sandhu |
| 2003/0081785 | A1 | 5/2003 | Boneh et al. |
| 2003/0115452 | A1 | 6/2003 | Sandhu et al. |

OTHER PUBLICATIONS

Wikipedia entry for "SecureID" as published on Aug. 10, 2003. http://en.wikipedia.org/w/index.php?title=SecurID &oldid=4328614.*
B. Kaliski. "RFC 2898: PKCS#5 Password Based Cryptography Specification Version 1.0" Published Sep. 2000.*
Schneier, Bruce. Applied Cryptography, 2nd Edition. © 1996 John Wiley and Sons, Inc. (pp. 30, 52, & 53).*
Bellovin et al., "Encrypted Key Exchange: Password-Based Protocols Secure Against Dictionary Attacks," IEEE Computer Society Press, pp. 72-84, 1992.

(Continued)

*Primary Examiner*—Kimyen Vu
*Assistant Examiner*—Thomas Gyorfi
(74) *Attorney, Agent, or Firm*—Alan Kamrath; Kamrath & Associates PA (57) ABSTRACT

Techniques and systems for protecting verifiable digital secrets such as encryption keys and identification codes based on partition and recovery processes are described. Implementations of the present techniques may be used, for example, to offer individuals a personalized tool for protecting secret data and to provide enhanced security. The partition and recovery may be carried out at the same computer or on separate computers.

33 Claims, 5 Drawing Sheets

OTHER PUBLICATIONS

FIPS PUB 180-1, Secure Hash Standard, 1995.

David Jablon, Strong Password-Only Authenticated Key Exchange, ACM SIGCOMM Computer Communication Review, 26(5), pp. 5-26, 1996.

Perlman et al., "Secure Password-Based Protocol for Downloading a Private Key", Proc. 1999 Network and Distributed System Security Symposium, Internet Society, Jan. 1999.

Rivest et al., "A Method for Obtaining Digital Signatures and Public-Key Cryptosystems" Communications of the ACM, 21(2), pp. 120-126, 1978.

R. Rivest, "The MD5 Message-Digest Algorithm", RFC 1321, 1992.

RSA Laboratories, PKCS #5 v.2.0: Password-Based Cryptography Standard, 1999.

Adi Shamir, "How to Share a Secret" Communications of the ACM, 24(11), pp. 612-613, 1979.

* cited by examiner

PARTITION AND RECOVERY OF A VERIFIABLE DIGITAL SECRET

This application claims the priority of U.S. provisional patent application No. 60/510,443 entitled "PARTITION AND RECOVERY OF A SECRET" and filed on Oct. 10, 2003, the entire disclosure of which is considered part of and is incorporated by reference as part of the disclosure of this application.

TECHNICAL FIELD

This application relates to digital security techniques, devices, and systems and to secret data protection for security functions in computers, computer systems and networks, and other information and communications systems and networks.

BACKGROUND

Many information systems such as computer networks use secret data to perform security functions which include but are not limited to entity authentication, data encryption or decryption, communication integrity protection, and other security services. For example, passwords or PINs (Personal Identification Numbers) are common secret data as an input to authenticate a user. Chosen by owners or authorized users, passwords and PINs are probably among the earliest types of secret data used in security services. Those human-chosen secrets are generally considered weak secrets, because such secrets are often guessable and thus are vulnerable to several known attacks, particularly in the environment of the Internet or other computer networks. It is generally recognized that use of human-chosen secrets alone may not be sufficient to successfully perform security services in many circumstances. Accordingly, other forms of secret data may be further required for security services. Examples of secret data that are not chosen by users include but are not limited to private keys used in a Public-Key Infrastructure (PKI) environment, vendor-provided PINs—long PINs—used for authenticating a bank account or a membership, vendor-provided decryption keys for deciphering scrambled information contents, secret keys of symmetric cryptography for generating Message Authentication Codes (MACs), session keys for keeping message confidential during a communication session, and other secret information. Such secrets are not chosen by users and are usually generated by computer codes. Secrets of this type are hereafter referred to as computer-generated secrets. Protection of both the computer-generated secrets and the human-chosen secrets is increasingly important and is becoming increasing difficult on the Internet and computer networks in general.

Computer-generated secrets for security services usually include more data bits than a user chosen secret does and often present no semantic meanings to human beings. Due to this lack of semantic meaning, it is generally difficult if not impossible for a person to memorize computer-generated secrets. Therefore, there exist two needs with different orientations. There is a human need for using user chosen secrets like passwords; on the other hand, there is a system need for using computer-generated secrets like cryptographic keys. In the past decades of the Internet era, many solutions were developed to meet both needs in an information system. A solution is acceptable only if it securely protects both the computer-generated secret and the human-chosen secret.

In one approach, a computer-generated secret is generated, regenerated or recovered at a client by accepting human-chosen secret data and with the assistance of other computing facilities connected to the client through the network. In this context, a client is a network station or device that is capable of performing computational task and communicating with other network stations or devices. Other network-connected computing facilities to assist a client are referred to as servers.

Various solutions for adopting the server-assistance approach were surveyed by R. Perlman and C. Kaufman and published in "Secure Password-Based Protocol for Downloading a Private Key," Proc. 1999 Network and Distributed System Security Symposium, Internet Society (January 1999). The Bellovin and Merritt's EKE (Encrypted Key Exchange) protocol (1992) is included in this survey. See, Bellovin and Merritt in "Encrypted Key Exchange: Password-Based Protocols Secure Against Dictionary Attacks," in Proceedings of the IEEE Symposium on Security and Privacy, pp. 72-84 (1992). EKE allows a client and a server sharing a common password to generate cryptographic keys for confidential and authenticated message communications. Related patents include U.S. Pat. Nos. 5,241,599 and 5,440,635. These and other solutions with the server-assistance approach are limited in their effectiveness in part because the server represents a major vulnerability or involves authenticated and often complicated communications with clients.

Kaliski presented a method in 2001 that permits a client to regenerate a computer-generated secret (a strong secret) from human-chosen secrets (weak secret data) with the assistance of servers while remaining resistant to attacks on the servers. See, U.S. patent publication No. 20010055388 entitled "Server-assisted regeneration of a strong secret from a weak secret." In one application, the regenerated secret is an input to user authentication. In another application, the regenerated secret is a decryption key to decipher private data such as a private key in public-key cryptography. An indispensable part of the method is a computing process for generating strong secrets. In other words, the regenerated strong secret is initially generated by the same method, not originated from a system implemented with other secret-data generating schemes.

In another approach, the computer-generated secret is stored on a secure hardware token. The hardware token is physically connected to a client computer and the secret is made accessible to a user at the client computer by accepting the user's chosen secret. An integrated circuit card (IC card) is a typical example of secure hardware tokens. IC cards consist of two-factor authenticator, the card and the PIN. A PIN, a short PIN, is chosen by a cardholder and is used to authenticate the cardholder's access to a computer-generated secret, such as a private key, stored on the card. IC cards have secure, tamper-resistant memory to store secrets. In some implementations, processors inside IC cards are able to perform critical computation entirely within a card, thereby preventing the protected secret from leaking out. As an example, signing the digital fingerprint of a message is confined in a card where the signature private key is stored. This additional capability is useful for protecting highly sensitive secret information.

In the physical-token approach, the secret under protection can be originated from a variety of secret-data generating computer codes. In this sense, the physical-token approach can be adopted to accommodate the need of various security services now in use or those to be developed in the future.

Using IC cards to protect computer-generated secret data needs additional hardware cost, because it demands the use of cards as well as card readers and other equipment such as card manufacturing equipment. Using IC cards further causes user inconvenience since card readers are not yet ubiquitous.

Other memory devices or storage apparatuses like a USB (Universal Serial Bus) or a RFID (Radio Frequency Identification) tag or a diskette are more convenient and less costly. Data on these mediums are easier to be copied. Therefore, a USB or a RFID tag or a diskette or something alike may not be a secure token. Secrets stored in these mediums are often encrypted using a password as the encryption key. The password or its verification data (such as a hash value of the password) must be saved somewhere for validating password entries. Theft of the password or the verification data presents a threat to security of such secrets. Password guessing is another threat when the encrypted secret is available or is accessible to attackers. Cryptanalysis is a further threat to break the encrypted secret; some cryptanalysis techniques demand no prior knowledge about the encryption key—the password.

SUMMARY

In recognition of the above, there is a need for a more effective and efficient method for protecting a computer-generated secret and permitting a client to regenerate or recover the secret through user chosen secrets without the assistance of servers. To yield greater utility for the method, the secret under protection should not be limited to the inputs to a specific security service and should not be limited to those secret data generated by specific computer codes.

The protected secrets suitable for the present techniques include, among others, cryptographic keys for enciphering and deciphering messages using techniques of symmetric cryptography, private keys of public-key and private-key pairs in a PKI (Public Key Infrastructure) environment, vendor-provided long identification numbers or codes used for authenticating a bank account or a membership, and other computer-generated secret data. These secrets have one feature in common—verifiability. In some circumstances, the regeneration or recovery of a computer-generated secret from user-chosen secret data must meet further constraints. For example, a computer-generated secret with a certain purpose must be regenerated or recovered only at a specific client or only with an irreplaceable token. Thus, there is a need for a more flexible method for regenerating or recovering a computer-generated secret from passwords and other selected data, wherein the additional selected data are used to impose certain conditions on regeneration or recovery of the secret.

Implementations of the present techniques may be used, for example, to offer individuals a personalized tool for such secret data protection and allows them to apply this tool at client sides around the network, and to allow users to use a personalized tool with their passwords but without the need of saving in storages or communicating with servers their passwords or information derived from their passwords. As another example, implementations of the present techniques may also be used for recovering computer-generated secrets from user-chosen data including passwords. The recovery may be carried out entirely within the computing facilities of a client site.

A method of this application combines a partition process and a recovery process for protecting a digital secret. In the partition process, a personalized input determined by an authorized user or the owner of the protected secret is transformed into a secret-independent digital segment according to a first transformation function. Next, both the secret-independent digital segment and the digital secret itself are used as input to a second transformation function to produce a secret-dependent digital segment that conceals the digital secret. After the secret-dependent digital segment is produced, the secret-independent digital segment and the protected secret itself are deleted from the computer memory. In recovery of the digital secret, a user who initiates the recovery is first requested to provide (1) the secret-dependent digital segment and (2) the personalized input. Next, the computation of the recovery process is carried out from a first input from the user in response to the request for the secret-dependent digital segment and a second input from the user in response to the request for the secret-independent digital segment. This produces an output to the user. The output reveals the digital secret to the user only when both the first input matches the secret-dependent digital segment and the second input matches the personalized input.

In the above, the partition process comprises a first transformation function and a second transformation function, while the recovery process comprises the same first transformation function and a third transformation function. The first function transforms a personalized input into a secret-independent digital segment. The second function uses two inputs, the secret-independent digital segment produced from the first transformation and the secret itself, and transforms the inputs into a secret-dependent digital segment. The third transformation function has two inputs. Given the same secret-independent digital segment as one input, the third transformation function is an inverse transformation of the second transformation function.

The personalized input may be highly personalized and unique. Passwords selected by the owner or an authorized user of the protected secret may be used as the entirety or a part of a personalized input. In some circumstances, the personalized input is a selected input comprising a selected password and a device-specific code. Availability of the device-specific code may be restricted to a specified device. Chosen data as part of the personalized input, in general, may include passwords, random numbers, and identification data like distinguishing identifiers, identification codes of personal devices, names or identification data for locations.

In one implementation, the protection of the digital secret may be enhanced by removing any data on the digital secret and the secret-dependent digital segment from the computer network to eliminate the possibility of being attacked via the computer network. This may be achieved, for example, by first storing the secret-dependent digital segment in a portable storage device prior to the removal operation. The portable storage device is then disconnected from the computer network. In this process, the secret-dependent digital segment is not kept in any persistent memory in the computer network or a device.

In one implementation, the computation of a recovery process is carried out at a client site upon request from the owner or an authorized user of the secret, and, subsequently, the recovered secret is validated at the same client site. Verification data needed for this validation task may be made available on this client.

Additional methods and devices described in this application include, but are not limited to, the following.

1. A method for protecting a digital secret, comprising:
transforming a user-selected password, which is independent of a digital secret to be protected, into a temporary value by a first transformation;
using the temporary value and the digital secret as inputs to a second transformation to produce a secret-dependent digital segment in a transitory memory;
storing the secret-dependent digital segment in a persistent memory;
deleting the secret-dependent digital segment from the transitory memory; and deleting the digital secret and the temporary value from each memory associated with computations of the first and second transformations.

2. The method as in the above item No. 1, further comprising:

receiving a password and a secret-dependent segment from a user requesting the recovery of the digital secret;

without a prior validation of the received password, using the received password and the received secret-dependent digital segment as inputs to a third transformation to compute a value as a recovered secret;

validating the recovered secret with verification information that has a relationship with the digital secret; and determining whether the received password matches the selected password and whether the received secret-dependent digital segment matches the secret-dependent digital segment according to an outcome of the validating step.

3. The method as in the above item No. 2, wherein the first and second transformations are configured, respectively, as a first function $f_1$ and a second function $f_2$, and the third transformation is configured as a composite function of the first function $f_1$ and a third function $f_3$ in the sequence of computing $f_1$ first and subsequently computing $f_3$.

4. The method as in the above item No. 3, wherein the first, the second, and the third functions are as follows:

(1) $U=f_1(password)=hash(password)+\beta$, where hash( ) is a collision-resistant hash function producing a positive integer for all instances of the password and $\beta$ is a constant non-negative integer;

(2) $V=f_2(U, S)=(U+\alpha \times S) \mod q$, where U is an input value representing an output instance produced by the function $f_1$, S is a positive integer representing an instance of the digital secret, q is a positive integer larger than all instances of the digital secret and also larger than hash(password) for all instances of the password, $\alpha$ is a positive integer relatively prime to q; and (3) $S=f_3(U, V)=(\alpha^{-1} \times V+((-(\alpha^{-1} \times U \mod q)) \mod q)) \mod q$, where U is an input value representing an output instance produced by the function $f_1$, V is an input value representing an instance of the secret-dependent digital segment, q is the sufficiently large integer as defined in $f_2$, $\alpha$ is also as defined in $f_2$, and $\alpha^{-1}$ is the multiplicative inverse of $\alpha$, modulo q.

5. The method as in the above item No. 1, further comprising using a cryptographic key as at least part of the digital secret.

6. The method as in the above item No. 5, wherein the cryptographic key is a key in a symmetric cryptographic system.

7. The method as in the above item No. 5, wherein the cryptographic key is a private key of a key pair of a public key and the private key.

8. The method as in the above item No. 1, further comprising using an identification code for access to a secured information system as at least part of the digital secret.

9. The method as in the above item No. 1, further comprising:

performing the first and the second transformations in a computer system to which the persistent memory is connected to receive and store the secret-dependent digital segment; and upon completion of the second transformation and storing the secret-dependent digital segment, disconnecting the persistent memory from the computer system.

10. The method as in the above item No. 1, further comprising selecting a collision-free mapping function to compute the first transformation.

11. The method as in the above item No. 1, further comprising selecting a collision-resistant hash function to compute the first transformation.

12. The method as in the above item No. 1, further comprising:

configuring the first and second transformations as a first function $f_1$ and a second function $f_2$, respectively, such that a composite transformation by first computing the function $f_1$ and subsequently computing the function $f_2$, for a given digital secret and expressed as $f_2(f_1(input\ data), the\ given\ digital\ secret)$, is one of a collision-free mapping function and a collision-resistant hash function with respect to the input data in $f_1$(input data).

13. The method as in the above item No. 1, further comprising:

configuring the first and second transformations as a first function $f_1$ and a second function $f_2$, respectively;

receiving a password and a secret-dependent segment from a user requesting the recovery of the digital secret;

without a prior validation of the received password, using the received password and the received secret-dependent digital segment as inputs to a third transformation to compute a value as a recovered secret;

making the computation of the secret-dependent digital segment by a composite function of $f_1$ and $f_2$ in the sequence of computing $f_1$ first and subsequently computing $f_2$ and the recovery of the digital secret by the third transformation be in an inverse relationship when the received password matches the selected password.

14. The method as in the above item No. 1, further comprising using a portable storage device as the persistent memory to store the secret-dependent digital segment.

15. The method as in the above item No. 14, wherein the portable storage device comprises a digital processor, and wherein the method further comprising performing the first and the second transformations on the digital processor.

16. The method as in the above item No. 15, further comprising:

receiving a password from a user requesting the recovery of the digital secret;

retrieving the secret-dependent segment;

without a prior validation of the received password, using the received password and the retrieved secret-dependent digital segment as inputs to a third transformation to compute a value as a recovered secret;

performing the third transformation on the digital processor.

17. The method as in the above item No. 14, wherein the portable storage device comprises a digital processor, and wherein the method further comprising:

receiving a password from a user requesting the recovery of the digital secret;

retrieving the secret-dependent segment;

without a prior validation of the received password, using the received password and the retrieved secret-dependent digital segment as inputs to a third transformation to compute a value as a recovered secret;

performing the third transformation on the digital processor.

18. The method as in the above item No. 1, further comprising avoiding storing the selected password and a derivative of the selected password other than the secret-dependent digital segment in a persistent memory.

19. A method for protecting a digital secret, comprising:

accepting a digital secret as a protection object;

combining a selected password from an authorized user and a device-specific code from a device into a selected input;

transforming the selected input into a temporary value by a first transformation;

using the digital secret and the temporary value as inputs to a second transformation to produce a secret-dependent digital segment in a persistent memory of the device; and deleting the digital secret and the temporary value from each memory associated with the computations of the first and second transformations.

20. The method as in the above item No. 19, further comprising avoiding storing the selected password and a derivative of the selected password other than the secret-dependent digital segment in a persistent memory.

21. The method as in the above item No. 19, wherein the selected password and the device-specific code are combined as a concatenated bit string of data bits of the selected password and the device-specific code in either one of a first order where data bits for the selected password are before data bits from the device-specific code and a second order where data bits for the selected password are after data bits from the device-specific code.

22. The method as in the above item No. 19, further comprising:

receiving a password from a user requesting the recovery of the digital secret;

accessing the device to obtain the device-specific code;

combining the received password and the obtained device-specific code into a received input;

transforming the received input into a temporary value by the first transformation;

retrieving the secret-dependent digital segment from the persistent memory of the device; and without a prior validation of the received password, using the temporary value and the retrieved secret-dependent digital segment as inputs to a third transformation to compute a value as a recovered secret.

23. The method as in the above item No. 22, further comprising:

configuring the first, the second, and the third transformations as a first function $f_1$, a second function $f_2$, and a third function $f_3$, respectively, such that the computation of the secret-dependent digital segment by a composite function of $f_1$ and $f_2$ in the sequence of computing $f_1$ first and subsequently computing $f_2$ and the recovery of the digital secret by a composite function of $f_1$ and $f_3$ in the sequence of computing $f_1$ first and subsequently computing $f_3$ be in an inverse relationship when the received input matches the selected input.

24. The method as in the above item No. 22, wherein the device comprises a digital processor.

25. The method as in the above item No. 24, further comprising restricting the computation of the first transformation to the digital processor.

26. The method as in the above item No. 19, wherein the device is portable.

27. The method as in the above item No. 19, further comprising:

configuring the first and the second transformations as a first function $f_1$ and a second function $f_2$, respectively, such that a composite transformation by first computing the function $f_1$ and subsequently computing the function $f_2$, for a given digital secret and expressed as $f_2(f_1(\text{input data}), \text{the given digital secret})$, is one of a collision-free mapping function and a collision-resistant hash function with respect to the input data in $f_1(\text{input data})$.

28. A method for protecting a digital secret, comprising:

transforming a personalized input into a secret-independent digital segment according to a first transformation function, wherein a content of the personalized input is independent of the digital secret;

using the secret-independent digital segment and the digital secret as inputs to a second transformation function to produce a secret-dependent digital segment which digitally conceals the digital secret, wherein a third transformation function exists to use the secret-independent digital segment and the secret-dependent digital segment as inputs for recovering the digital secret;

storing the secret-dependent digital segment in a persistent memory;

deleting the digital secret and the secret-independent digital segment from each memory associated with computations of the first and second transformation functions;

requesting a user who initiates the recovery to provide (1) the personalized input and (2) the secret-dependent digital segment for recovering the concealed digital secret; and applying the computation of the third transformation function from a first input from the user in response to the request for the secret-independent digital segment and a second input from the user in response to the request for the secret-dependent digital segment to produce an output to the user, wherein the output reveals the digital secret to the user only when both the first input matches personalized input and the second input matches the secret-dependent digital segment.

29. The method as in the above item No. 28, wherein the digital secret comprises a cryptographic key.

30. The method as in the above item No. 29, wherein the cryptographic key is a key in a symmetric cryptographic system.

31. The method as in the above item No. 29, wherein the cryptographic key is a private key of a key pair of a public key and the private key.

32. The method as in the above item No. 28, wherein the digital secret comprises an identification code for access to a secured information system.

33. The method as in the above item No. 28, wherein the personalized input comprises passwords, unique identifiers, location identification data, device identification codes, randomly-generated numbers, or a combination of these data.

34. The method as in the above item No. 28, further comprising:

after the computation of the third transformation function, performing a validation process to verify the output of the computation.

35. The method as in the above item No. 34, wherein the validation uses verification information that has a relationship with the digital secret.

36. The method as in the above item No. 28, wherein the first transformation function is a collision-free mapping function or a collision-resistant hash function.

37. The method as in the above item No. 28, wherein the composite transformation by computing the first and second transformation functions as sequenced, for a given digital secret and expressed as $f_2(f_1(\text{input data}), \text{the given digital secret})$, is a collision-free mapping function or a collision-resistant hash function with respect to the input data in $f_1(\text{input data})$.

38. An article comprising a machine-readable medium that stores machine-executable instructions for protecting a digital secret, the instructions causing a machine to:

transform a user-selected password, which is independent of a digital secret to be protected, into a temporary value by a first transformation;

use the temporary value and the digital secret as inputs to a second transformation to produce a secret-dependent digital segment in a transitory memory;

store the secret-dependent digital segment in a persistent memory;

delete the secret-dependent digital segment from the transitory memory; and delete the digital secret and the temporary value from each memory associated with computations of the first and second transformations.

39. The article as in the above item No. 38, wherein the instructions further cause the machine to:

receive a password and a secret-dependent segment from a user requesting the recovery of the digital secret;

without a prior validation of the received password, use the received password and the received secret-dependent digital segment as inputs to a third transformation to compute a value as a recovered secret;

validate the recovered secret with verification information that has a relationship with the digital secret; and determine whether the received password matches the selected password and whether the received secret-dependent digital segment matches the secret-dependent digital segment according to an outcome of the validating operation.

40. The article as in the above item No. 39, wherein the first and second transformations are configured, respectively, as a first function $f_1$ and a second function $f_2$, and the third transformation is configured as a composite function of $f_1$ and a third function $f_3$ in the sequence of computing $f_1$ first and subsequently computing $f_3$.

41. The article as in the above item No. 40, wherein the first, the second, and the third functions are as follows:

(1) $U=-f_1(password)=hash(password)+\beta$, where hash( ) is a collision-resistant hash function producing a positive integer for all instances of the password and $\beta$ is a constant non-negative integer;

(2) $V=f_2(U, S)=(U+\alpha \times S) \bmod q$, where U is an input value representing an output instance produced by the first function $f_1$, S is a positive integer representing an instance of the digital secret, q is a positive integer larger than all instances of the digital secret and also larger than hash(password) for all instances of the password, $\alpha$ is a positive integer relatively prime to q; and (3) $S=f_3(U, V)=(\alpha^{-1} \times V+((-((\alpha^{-1} \times U) \bmod q)) \bmod q)) \bmod q$, where V is an input value representing an instance of the secret-dependent digital segment, U, q, and $\alpha$ are as defined in $f_2$, and $\alpha^{-1}$ is the multiplicative inverse of $\alpha$, modulo q.

42. A computer system, comprising:

means for transforming a personalized input into a secret-independent digital segment according to a first transformation function, wherein a content of the personalized input is independent of the digital secret;

means for using the secret-independent digital segment and the digital secret as inputs to a second transformation function to produce a secret-dependent digital segment which digitally conceals the digital secret, wherein a third transformation function exists to use the secret-independent digital segment and the secret-dependent digital segment as inputs for recovering the digital secret;

means for accessing a persistent memory to store the secret-dependent digital segment;

means for removing the secret-dependent digital segment from the computer system; and means for deleting the secret-independent digital segment and the digital secret from the computer system after completing computations of the first and second transformation functions.

43. The computer system as in the above item No. 42, further comprising:

means for requesting a user who initiates the recovery to provide (1) the personalized input and (2) the secret-dependent digital segment for recovering the concealed digital secret; and means for computing the third transformation function from a first input from the user in response to the request for the secret-independent digital segment and a second input from the user in response to the request for the secret-dependent digital segment to produce an output to reveal the digital secret to the user only when both the first input matches personalized input and the second input matches the secret-dependent digital segment.

44. The computer system as in the above item No. 43, further comprising:

means for performing a validation process to verify the output of the computation after the computation of the third transformation function, wherein the validation uses verification information that has a relationship with the digital secret.

These and other implementations and variations, and associated advantages are described in greater detail with reference to the drawings, the detailed description, and the claims.

DETAILED DESCRIPTION

The techniques described in this application have various applications, e.g., accepting secrets generated from existing digital security systems as protected targets. A protected target suitable for the techniques described here may be in various forms and is not limited to one particular type of secrets. For example, the protected target may be generic, including various computer-generated secrets used in security services in the network environment. The protected target can be kept unaltered and confidential during or even beyond its lifetime in various applications. As a digital secret, the protected target may be a string of binary digits and may be converted into a positive integer through the mapping of the canonical integer representation. The canonical integer representation of a bit string $a_m a_{m-1} \ldots a_1 a_0$ may be defined as $a_m \times 2^m + \ldots + a_1 \times 2 + a_0$.

In implementing the techniques described here, the protected target should be verifiable in order to fully utilize the potentials of the techniques. Most computer-generated secrets for the purpose of security services are verifiable. A secret is verifiable if the correctness of its value can be verified. The verification of a secret usually utilizes verification data. For example, a hash value of a long PIN can be used as the verification data for verifying the correctness of a PIN entry. As a second example, a public key in a key pair of a private key and the public key is the verification data for verifying whether a value instance of the private key is correct.

In some examples described here, certain devices in a computer network are referred to as clients or client sites that are used to regenerate or recover digital secrets. In some applications, a client or a client site may be a network station or device capable of performing computational tasks and communicating with other network stations or devices. A client may be used for individual's accesses to the network in many applications but may also have other uses and functionalities. Clients may be classified as (1) client computers, e.g., personal computers or computers primarily for personal usages, and (2) portable client processors, such as Personal Digital Assistants (PDA) and certain wireless phones. A client computer or a portable client processor may include computing facilities, networking facilities and storage devices. The storage devices of a client may include, a fixed or a portable peripheral of a persistent memory, wherein the information in the portable peripheral can be made accessible to the processor of the client.

The techniques described here partition a protected secret, by computation, into two digital segments—one secret-dependent digital segment and one secret-independent digital segment. The same secret is recovered, also by computation, upon demand through these two segments. Accordingly, the techniques described here are used in two different processes: partition and recovery.

In the examples described here, the partition process begins with the selection of a personalized input, then computes the secret-independent digital segment from the personalized input, and further computes the secret-dependent digital segment from the secret-independent digital segment and the secret under protection. The partition process ends in storing the secret-dependent digital segment in a storage device with persistent memory.

In the above process, the personalized input to yield the secret-independent digital segment may be determined or selected by the owner or an authorized user of the protected secret. The personalized input is confidential and is known only to the owner or authorized user. The personalized input may be highly personalized, e.g., to be unique in some instances, to facilitate the owner or authorized user to memorize the input and to increase the difficulty in guessing the input by others. The secret-independent digital segment is denoted as secret-independent because the selection of the personalized input is independent of the protected secret. As an example, a password may be used as the personalized input. The personalized input may use data other than passwords. For example, the personalized input may be a selected input that comprises a user-selected password and a device-specific code. Passwords are generally considered as weak secrets because they may be guessed by using programmed instructions. However, passwords can be properly used to provide a natural and user-friendly interface for human users. Optional chosen data as part of the personalized input may include additional passwords, random numbers, and identification data like distinguishing identifiers, identification codes of personal devices, names or identification data for locations.

The partition process may be carried out several times for processing and protecting the same computer-generated secret in some circumstances. As an example, when the secret's owner or an authorized user wants to change the personalized input and to update the secret-dependent digital segment, the partition process may be performed again. The secret to be partitioned again can be obtained either from where it was originally generated or through the recovery process.

The recovery process in the examples described here begins with receiving an input provided as the personalized input that is previously selected as the input to the partition process. Next, the recovery process proceeds to compute a temporary value from the received input and to retrieve the secret-dependent digital segment from its storage, and then proceeds to recover the secret from the temporary value and the retrieved secret-dependent digital segment. The temporary value is the secret-independent digital segment if the received input is correct, i.e. the received input is identical to the personalized input.

A validation task follows the task of a recovery. The way of validation is executed is a notable feature of the techniques described here. An entry input, such as a password entry, is not validated right after the entry. It is the recovered secret that is verified. Therefore, the validation is an indirect validation process. With such an indirect validation strategy, passwords or information derived from passwords (for example, hash values or ciphers of passwords) need not be stored as the verification data. In this validation process, the verification data may include, for example, public keys and hash values. To validate a recovered private key, the public key associated with the authentic private key is adopted as the verification data. To validate a recovered long PIN, a hash value of the authentic PIN can be used as the verification data. Along with a partition process, an initialization process may be performed for preparing the verification data.

The partition process uses two transformation function $f_1$ and $f_2$ in generating the secret-dependent digital segment and the secret-independent digital segment:

(1) secret-independent digital segment=$f_1$(input data), where "input data" is an instance of the personalized input and the selection of this data is independent of the secret under protection, and (2) secret-dependent digital segment=$f_2(f_1$(input data), S), where S is the secret under protection.

The recovery process uses the same $f_1$ above and a third transformation function $f_3$ to recover the secret concealed during the partition process:

(1) S=$f_3(f_1$(input data), secret-dependent digital segment), where "input data" and S are as defined in $f_1$ and $f_2$ above.

The above three transformation functions $f_1$, $f_2$ and $f_3$ define the partition and recovery processes. Appropriate formulation of these transformation functions is part of an embodiment of the present invention. The three transformation functions may be implemented in various forms and the specific forms of these functions can be selected to meet specific needs of a particular application. However the specific forms of these functions are selected, the three transformation functions should be designed to have the following properties:

(1) The computation of the secret-independent digital segment is collision-free or collision-resistant; mathematically, the function $f_1$ is either a one-to-one mapping (i.e. a collision-free function) or a collision-resistant function, thereby it is impossible (if $f_1$ is collision free) or very unlikely (if $f_1$ is collision resistant) to obtain a same secret-independent segment value from different instances of the personalized input.

(2) Given the value S of a computer-generated secret, the computation of a secret-dependent digital segment by the composite transformation of the first and the second transformation functions as sequenced, i.e. $f_2(f_1$(input data), S)), is collision free or collision resistant producing a positive integer for all instances of the personalized input. (Note: the sequence of computing $f_2, f_1$ is first to compute $f_1$ and then to compute $f_2$.)

(3) Given an instance of the personalized input, i.e. given an instance of the secret-independent digital segment, the computation of a secret-dependent digital segment by $f_2$ and the recovery of a computer-generated secret by $f_3$ are in an inverse relationship.

(4) Without knowledge of the secret-dependent digital segment, knowledge of the secret-independent digital segment (or the personalized input to compute the secret-independent digital segment) alone leaves the protected secret undetermined.

(5) The input to the transformation function $f_1$ is independent of the protected secret. In other words, the selection of this personalized input and the generation of the protected secret are two events independent of each other.

(6) Knowledge of the secret-dependent digital segment yields no clue to the guess about the personalized input. The secret-dependent digital segment is the output of the second transformation that uses two mutually independent inputs—(1) the personalized input and (2) the protected secret.

In addition to the above properties, the configuration information of these three transformations, $f_1, f_2$, and $f_3$, should reveal as little knowledge as possible about the protected secret and should leave no clues to the guess about the protected secret. As such, the programmed instructions for executing these transformations can be installed in a client site where the environment may not be secure without compromising the security of the protected secret.

In some applications, the secret-dependent digital segment may be stored in a portable storage device with persistent memory. The secret-independent digital segment, however, is computed upon demand from input data. Passwords may be used as the primary personalized input and can be carried around by users in their memory. As a result, the recovery computation can be carried out at a non-specified client site of the network provided that the programmed instructions of these three transformations have been made available at the client site.

In other applications, the recovery process may be restricted by the system configuration to be carried out only at a specified client site. In such circumstances, certain data items of the selected personalized input are made available only from a storage device inseparable from the specified client site so that the recover process in general cannot be carried out at a different site or computer.

The formulation of these three transformations, $f_1, f_2$, and $f_3$, are often taken into consideration their relationships. As an example, the three transformations may given as follows:

(1) U=the secret-independent digital segment=$f_1$(input data)=SHA-1(input data), where SHA stands for the Secure Hash Algorithm. The "input data" represents an instance of the personalized input and SHA-1 is a known one-way hash function producing a positive integer less than $2^{160}$ for all instances of the personalized input.

(2) V=the secret-dependent digital segment=$f_2$(U, S)=(U+$\alpha$S) mod q, where S is the canonical positive integer representation of a protected secret, q is a chosen integer greater than all instances of S and is also no less than $2^{160}$, and $\alpha$ is a chosen positive integer relatively prime to q. (One is relatively prime to q. Thus, $\alpha$=1 is a simple case of $\alpha$.)

(3) S=$f_3$(U, V)=($\alpha^{-1}$×V+((−($\alpha^{-1}$×U mod q)) mod q)) mod q, where $\alpha^{-1}$ represents the multiplicative inverse of $\alpha$ in the modular arithmetic, modulo q.

The above three functions are not independent from one another but are related. It can be verified that the three transformations, $f_1, f_2$, and $f_3$, as formulated above satisfy the aforementioned six properties. This is in part due to that q is chosen as a constant greater than all instances of S and also greater than all instances of U, and in part due to that there exists a unique $\alpha^{-1}$ for a positive integer $\alpha$ that is relatively prime to q. Both constants q and $\alpha$ need not be kept confidential. The disclosure of q and $\alpha$ reveals only the information that S and U are less than q. Such disclosed information provides very little help for the guess about S or U, because q is sufficient large.

As a second example, a variation of the above formulation is given below:

(1) U=$f_1$(input data)=SHA-1(input data)+$\beta$;
(2) V=$f_2$(U, S)=(U+$\alpha$S) mod q; and
(3) S=$f_3$(U, V)=($\alpha^{-1}$×V+((−(($\alpha^{-1}$×U) mod q)) mod q)) mod q.

In this second formulation, all parameters except $\beta$ are as defined. The parameter $\beta$ is chosen as a constant positive integer. SHA-1input data) is a collision-resistant function producing a positive integer less than $2^{160}$ for all instances of the input data. Thus, the new function $f_1$, SHA-1(input data)+$\beta$, is also a collision-resistant function producing a positive integer less than $2^{160}$+$\beta$ for all instances of the input data. By mathematical deduction, the composite function of $f_1$ and $f_2$, i.e. V=$f_2$($f_1$(input data), S)=(SHA-1(input data)+$\beta$+$\alpha$S) mod q, is also a collision-resistant function with respect to the variable "input data" and produces a positive integer less than q. This deduction is in part due to the choice of q as a constant integer greater than all possible values of SHA-1(input data).

Another variation of the above formulation is given below:
(1) U=$f_1$(input data)=hash(hash(input data))+$\beta$, where "hash" stands for a collision-resistant function like SHA-1 or MD5 that produces a positive integer;
(2) V=$f_2$(U, S)=(U+$\alpha$S) mod q; and
(3) S=$f_3$(U, V)=($\alpha^{-1}$×V+((−(($\alpha^{-1}$×U) mod q)) mod q)) mod q.

In the above, a composite of two hash functions can be extended into a composite of a number of sequenced hash functions. It is true that the composite function of a sequence of collision-resistant functions is collision-resistant.

The utilization of one-way hash functions in the formulation of the first transformation function shown in the above examples helps to effectively expand the input space, i.e. enlarge the set containing all instances of the personalized input. As a result, the content selection of the personalized input is flexible and the owner or an authorized user of the protected secret is allowed to have the freedom to select the personalized input.

The secret-dependent digital segment may be designed to be portable and thus may be referred to as a portable segment. A portable storage device of persistent memory like a USB memory device or a diskette or a memory card may be used as an apparatus for this segment. Other storage devices for this segment may be peripherals of network-connected servers. Portable storage devices may be preferred for storing the secret-dependent digital segment at least in part because the recovery computation of a protected secret can be done entirely within the computing facilities of a non-specified client.

Furthermore, after the secret-dependent digital segment is stored in a portable storage device, the portable storage device may be disconnected from the computer network after any data on the secret-dependent digital segment is deleted or removed from the network. Therefore, the secret-dependent digital segment that has the information on the digital secret is no longer available in the network and an attacker cannot attack the digital secret even if the attacker can gain access to the network. This provides additional security in protection of the already protected digital secret.

A storage device for storing the secret-dependent digital segment may also include a disk or other storage peripheral bound to a specified client. As an example, the client may be a portable client with a client processor programmed to perform various processes and computations in the present techniques and the storage device may include a persistent memory that is part of the portable client processor. Such a processor, with a secret-dependent digital segment in its persistent memory, is capable of serving as a processor within which the recovery computations can be carried out and, in the meantime, serving as a client connected to the network.

For convenience to the end users, many applications may use passwords as the primary personalized input. The personalized input optionally includes additional identification data such as a manufacturer built-in identification code of a personal device for storing the secret-dependent digital segment, thereby binding this personal device to the recovery computation of the secret. Such built-in identification data can be made computer readable so that reading the data is done without human intervention.

It can be inferred from the recovery transformation function $f_3$ that, when the knowledge of the secret-dependent digital segment is available, guessing the computer-generated secret is reduced to the task of guessing the personalized input. Therefore, adding a random number into the personalized input adds resistance to brute-force guessing for the secret. The improved degree of security by adding a random number to the personalized input may be less evident if the secret's owner or authorized user diligently keeps the secret-dependent digital segment safe and prevents this segment from unauthorized uses. The added random number could be considered as a second portable segment, and, alternatively, may be stored in a persistent memory of a specified client, thereby restricting recovery of the computer-generated secret to be carried out only at this specified client site.

The personalized input used for computing a secret-independent digital segment may include a single data item or a combination of at least two items of data. A human-chosen secret, e.g. a password or a short PIN, is a typical example of single-item inputs. As an example for the combination of at least two items of data, one password and one device-specific code can be concatenated (e.g. password∥device ID or device ID∥password) together as the personalized input. As another example, three items can be concatenated together, e.g. password∥random number∥device ID, as the personalized input. Alternatively, the personalized input data may be divided into several groups, where each group is used to compute a secret-independent sub-segment, and then the final secret-independent segment is computed from all secret-independent sub-segments. In this way, each secret-independent sub-segment is, respectively, computed through a collision-free or collision-resistant function.

Upon completion of the recovery, the present techniques can further validate the recovered secret without validating the password entry or other input data. The way of validation depends on what the computer-generated secret and the verification data are even though the partition and recovery of a computer-generated secret may be the same. For example, a scheme called challenge-and-response validation process has been designed and implemented for the validation on value instances of a private key in a public-key cryptosystem. This is a legacy validation method in the Internet defined in several international standards including ISO/IEC 9798-3 (1998). The validation process may be implemented with four basic steps: (1) generate, randomly, a challenge message; (2) compute the response, i.e. sign a fingerprint of the challenge using the value that is supposed to be a valid private key; (3) decipher the response using the corresponding public key; and (4) compare the deciphered response with the fingerprint of the challenge message. By definition, a fingerprint of a challenge message is the output produced from transforming the message by a selected one-way hash function.

As another example, a hash value obtained by applying a selected one-way hash function twice on a long PIN, i.e. hash(hash(the long PIN)), may be adopted as the verification data. In validation, the same selected hash function is also applied twice on a recovered value instance for the long PIN and then the result is compared with the verification data. The double hashing is preferred than a single hashing in some circumstances to avoid the duplication of using the same hash value in a system site and a client site as well. Suppose that a client site uses a double-hashed value as the verification data while a system site uses a single-hashed value as another verification data. Disclosure of the double-hashed value reveals little information for a guess about the corresponding single-hashed value provided that the selected one-way hash function is computationally irreversible as it should be.

In some applications, the verification data and the secret-dependent digital segment may be intentionally stored together within one storage device. As such, the validation task can be subsequently executed at the same client site as the site where the recovery takes place.

When properly implemented, the verification data reveals no clues on guessing about the protected secret. The public key as the verification data in the aforementioned challenge-and-response scheme satisfies this requirement. The doubled-hashed hash value and the single-hashed hash value as mentioned also provide little clues on guessing the long PIN that is hashed.

Passwords are commonly used in many security services. The present techniques, however, use passwords as the entirety or a part of a personalized input in a way that is significantly different from the uses of passwords in other methods. A password is also used to generate a derivative and the derivative is used in digital security. A derivative of a password is defined here as a value derived from the password only, such as a transformation function that has an sole input variable for receiving a password. One example is a hash value of the password. In this context, certain derivatives of the password are not kept in persistent memory in implementations of the present techniques. The secret-dependent digital segment is derived from the password and is the output of the second transformation function $f_2$ that uses two mutually independent inputs: (1) the password (or, more generally, the personalized input) and (2) the protected secret. Hence, in the above-defined meaning of a derivative, the secret-dependent digital segment is not a derivative of the password because the second transformation function $f_2$ has more than one input variable.

In this context, many traditional methods use a password or a derivative thereof to retrieve and make available a secret. Accordingly, the password or its derivative need be stored in persistent memory for recovering the secret and the storage device may be hacked by attackers to steal the password information. In contrast, in the present techniques, a password is used in the recovery computation and the password itself or its derivatives need not be pre-stored somewhere for authentication check and is not part of the data element needed for retrieving the secret-dependent digital segment. The secret-dependent digital segment can be retrieved by, e.g., simply using an explicit filename for the segment. This difference is substantial in part because the way a password is used in the present techniques significantly improves the level of security and mitigates the risks associated with the attacks of passwords over the traditional use of passwords. The fact that the password is used to recover the computer-generated secret and is not for direct check in the present techniques gives strong password protection. Password theft, reuse, undetected sharing may become impossible, unless the owner or an authorized user keeps hand-written or digital copies for backup. Attacks utilizing server spoofing or server compromise would also be impossible, because passwords are not requested by or stored in servers. It is further noted that the present techniques can be implemented so that the end users may not be able to notice the difference and use the passwords the same way as they always do when using security systems based on the present techniques.

The present techniques may be implemented to use a two-factor authenticator: something a user should have (the secret-dependent digital segment and the verification data in a storage device) and something the user should know (the personalized input such as a password). With random numbers and additional identification data included in the personalized input, the present techniques may also be implemented with an n-factor authenticator; wherein n is greater than two. Separately safeguarding two or more factors of the authenticator reduces the chances for attackers to steal all information needed to launch search attacks such as a dictionary attack on the password.

In the worst-case scenario for an implementation of the present techniques where the secret-dependent digital segment and the verification data are obtained by an attacker, guessing the secret is reduced to the task of guessing the personalized input. Each guess on the personalized input, however, needs to execute a recovery task and a validation task in a system based on the present techniques and thus is very difficult. In some implementations, the validation of a recovered secret is a computation-intensive task. In the RSA cryptosystem, as an example, using a public key to verify a recovered private key involves exponential computations. Such computations significantly increase the difficulty of search attacks.

FIGS. 1 through 4 provide specific examples of implementations of the present techniques. Wherever possible, the same reference numbers are used in the drawings and the description to refer to the same or like parts.

Figure 1:
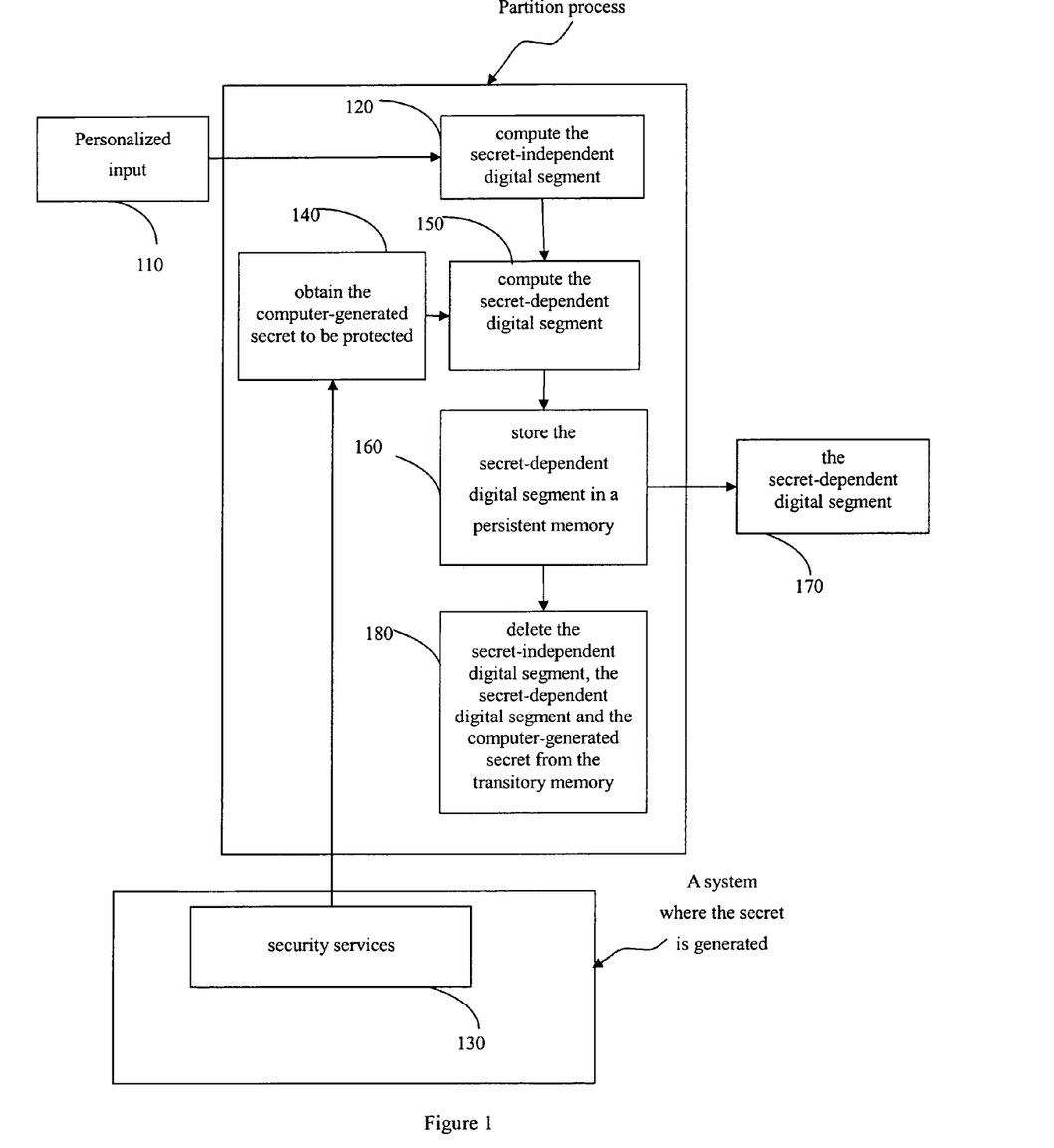
FIG. 1 is a block diagram illustrating an example of a partition process.

FIG. 1 shows operation steps in one implementation of the partition process and associated input and output interactions between this process and its working environment. The partition process, once initiated, requests an input 110 via an user interface from a user. The input 110 is a personalized input determined by the owner or an authorized user of the computer-generated secret. The input 110 may include a password and, optionally, additional passwords, random numbers, identification data or a combination of these data. The owner or the authorized user enters passwords, while other data may be automatically inputted to the partition process. The security service 130 on a system where the secret is generated supplies a computer-generated secret 140 to be protected. At step 120, the partition process applies a selected first transformation function $f_1$ to compute the secret-independent digital segment. A step 140 is executed to obtain the computer-generated secret 140 from the security service 130. At step 150, the partition process computes the secret-dependent digital segment 150 by using a selected second transformation function $f_2$. Next at step 160, the secret-dependent digital segment is stored in a persistent memory. The secret-dependent digital segment may be stored in a storage apparatus 170. Finally at step 180, the computer-generated secret, the secret-dependent segment and the secret-independent digital segment are deleted from the transitory memory.

Figure 2:
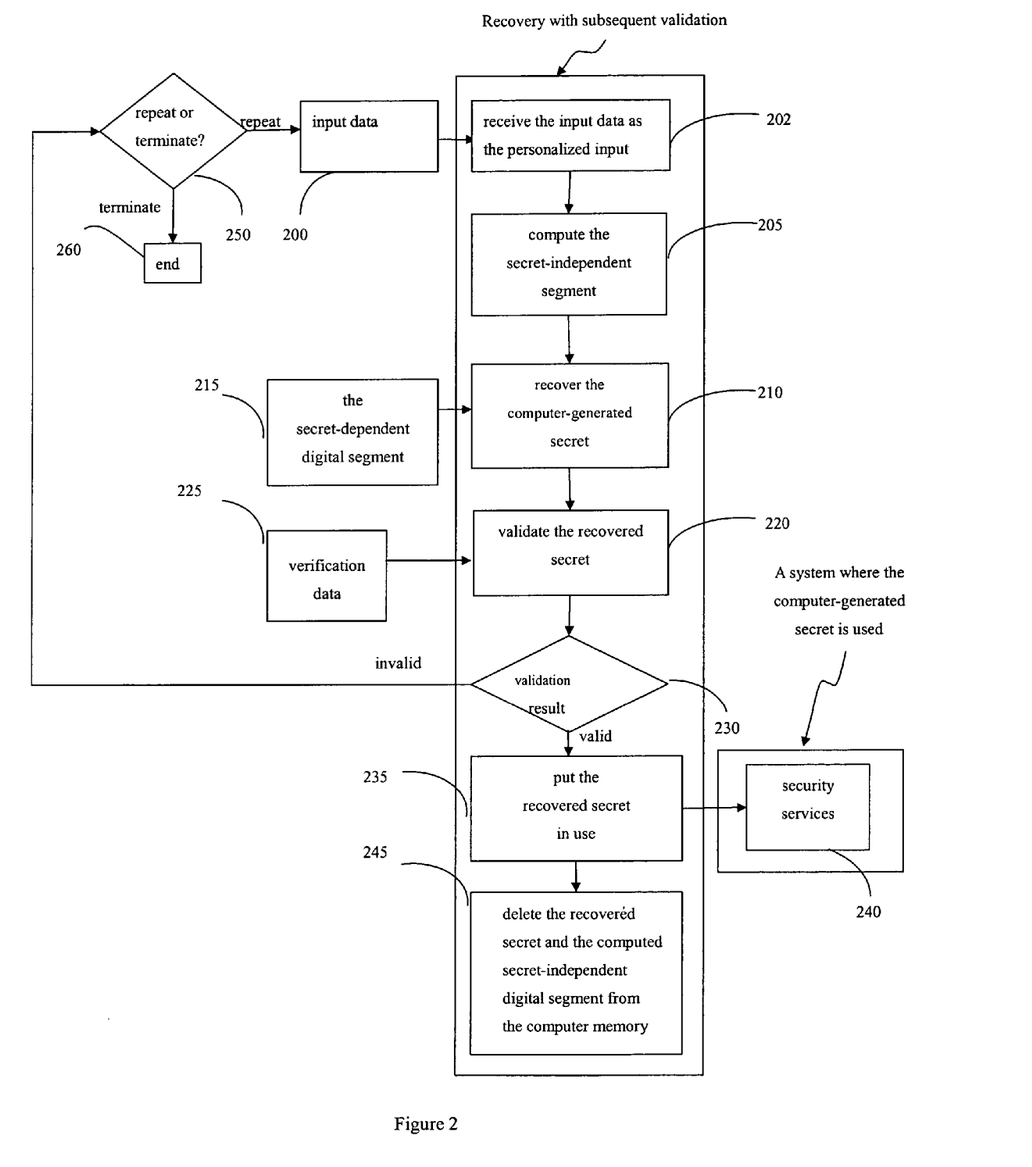
FIG. 2 is a block diagram illustrating an example of a recovery with a subsequent validation process.

FIG. 2 is a block diagram illustrating operation steps in one implementation of the recovery and subsequent validation and associated input and output interactions. The recovery process begins with requesting and receiving an input 200 at step 202 as the personalized input, proceeds to compute a secret-independent digital segment from the received input at step 205 and to retrieve the secret-dependent digital segment from its storage 215, and then recovers the computer-generated secret from the two digital segments in step 210. The input 200 is inputted as the personalized input defined in the corresponding partition process. The secret-independent digital segment is computed by the same first transformation function as that adopted in the partition process. The secret-dependent digital segment is previously generated by the partition process and stored in the storage apparatus 215. The secret is recovered by the third transformation function which has an inverse relationship with the second transformation function which is also adopted in the corresponding partition process. Verification data is generated by an initialization process and is stored in memory 225. At step 220, the verification data is retrieved and is used to validate the recovered secret. A validation result is produced at the end of the step 220. Next, step 230 is performed to determine whether the validation result of step 220 is invalid or valid. The validation result is decided as valid when the received input 200 matches the personalized input and the supplied secret-dependent digital segment stored in the storage device 215 and the verification data in the storage 225 are both authentic. If valid, the recovered secret is put in use at step 235 and is further supplied to security services 240 on a system where the computer-generated secret is used. At step 245, the recovered computer-generated secret and the computed secret-independent digital secret are deleted from the computer memory. If the validation result is invalid, whether to repeat or terminate is determined at step 250. If the decision is to terminate, the routine ends at step 260. If the decision is to repeat, the process is repeated beginning by requesting another input 200 from the user.

Figure 3:
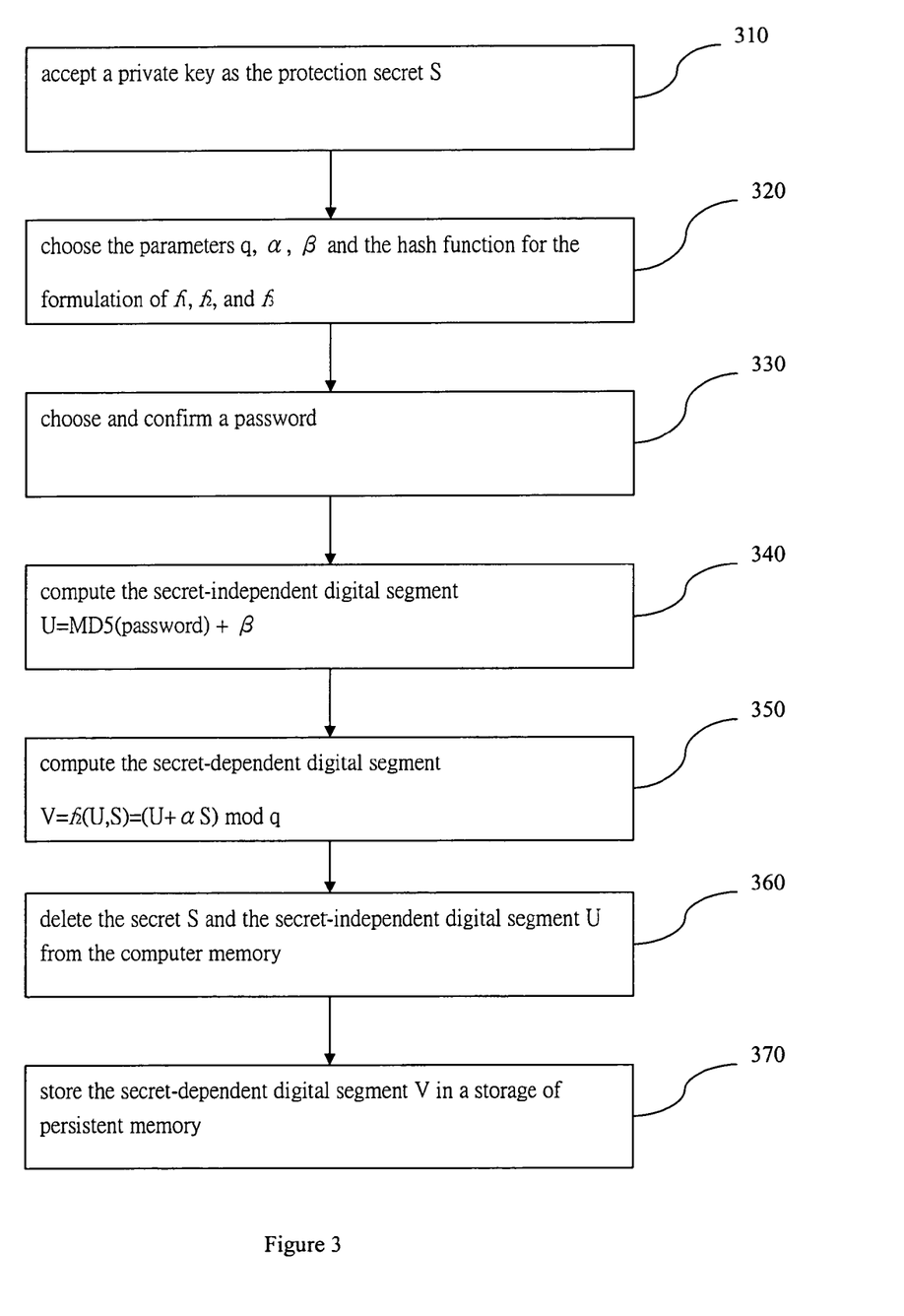
FIGS. 3 and 4 are flowcharts illustrating examples of a partition process and a recovery with a subsequent validation process, respectively, for protecting private keys.
Figure 4:
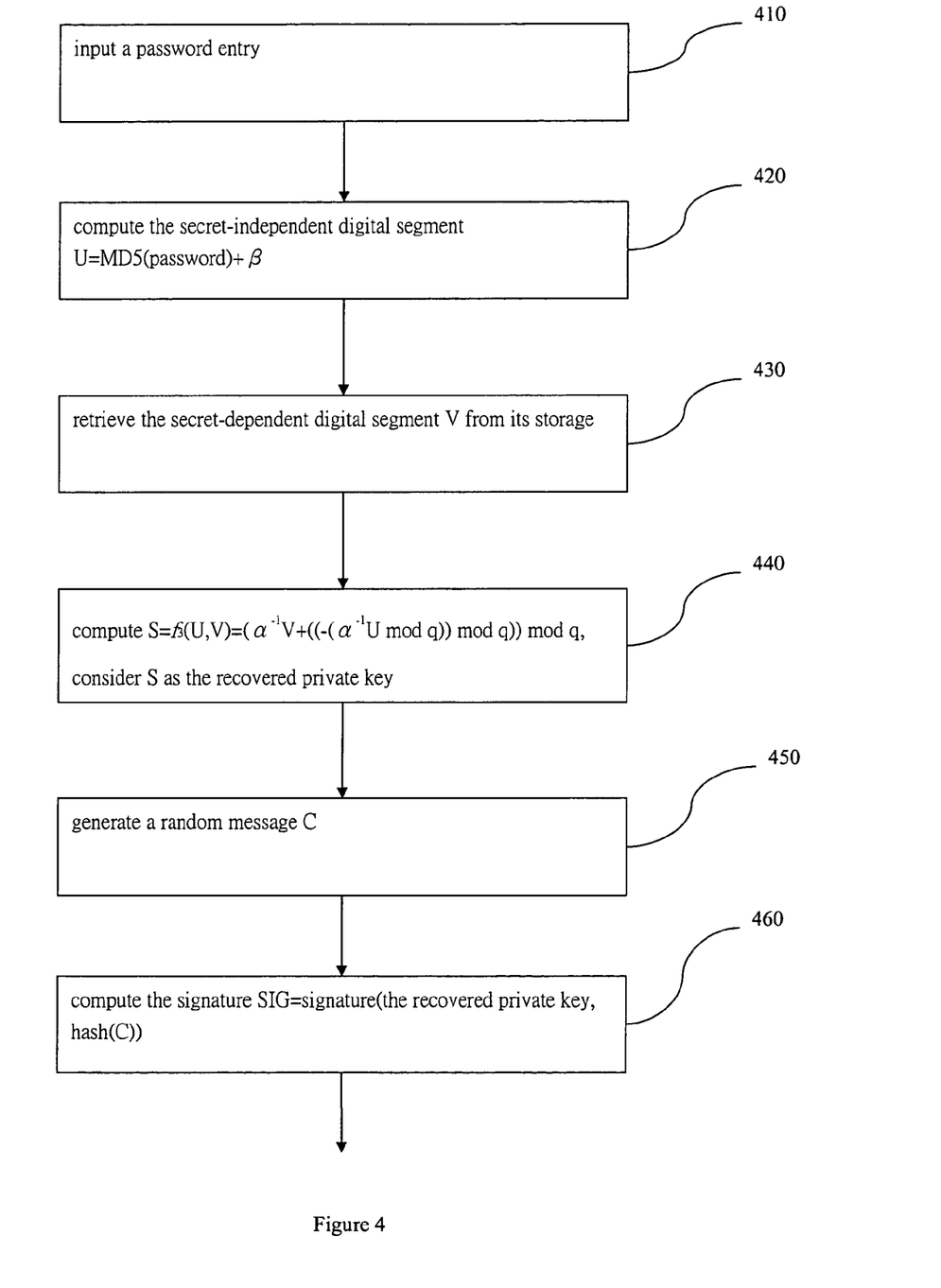

In implementations, the above described partition and verification processes may be implemented as computer software instructions. Such software instructions may be stored on one or more machine-readable storage media or devices connected to a computer or a computer system. In operation, one or more computer processors may be used to perform the described functions and operations. FIGS. 3 and 4 are respectively the flowcharts of an exemplary partition process and an exemplary recovery with a validation process as actions taken by the computer under control of the software instructions. It is assumed that the protected secret in FIGS. 3 and 4 is a private key S. The aforementioned challenge-and-response scheme is adopted into FIG. 4 as the validation method. The three transformation functions, $f_1$, $f_2$, and $f_3$, in this formulation are defined as follows and are slightly different from the aforementioned formulation examples (1) $U=f_1(\text{password})=\text{MD5}(\text{password})+\beta$, where MD5 is a known one-way hash function and $\beta$ is a constant positive integer;

(2) $V=f_2(U, S)=(U+\alpha S) \bmod q$, where S is the private key under protection, q is a positive integer larger than all instances of S and also larger than MD5(password) for all instances of the password, and $\alpha$ is a positive integer relatively prime to q; and (3) $S=f_3(U, V)=(\alpha^{-1}V+(-((\alpha^{-1}U) \bmod q))) \bmod q$, where $\alpha^{-1}$ is the multiplicative inverse of $\alpha$ with respect to modulo arithmetic, modulo q.

In this specific example, the personalized input is a password. It is known that the output of MD5 is a string of 128 binary digits. Thus, MD5(password) is less than $2^{128}$ for all instances of the password. Suppose that the size of a private key herein is 1024 bits. Then q can be chosen as $2^{1024}$ or larger, because $2^{1024}$ is larger than all instances of the private key and is larger than $2^{128}$. The determination of whether a guess about the password is correct involves the computation of at least one exponential expression with an integer representing the recovered digital secret as the exponent, assuming that a RSA-type cryptosystem is used here. Therefore, a properly selected parameter β can significantly increase the difficulty of search attacks on the password.

Referring to FIG. 3, a private key is accepted as the protected target S at step 310. The key is a bit string and is presented as a positive integer S. In step 320, three positive integers, q, α and β, are chosen where q is larger than $2^{1024}$ and α is relatively prime to q. In step 330, a password is chosen and confirmed as the personalized input by the owner or an authorized person of the protected private key S. In step 340, the secret-independent digital segment is computed by the selected first transformation function, i.e. U=MD5(password)+β. In step 350, the secret-dependent digital segment is computed by the selected second transformation function, i.e. V=(U+αS) mod q. In step 360, the private key S and the secret-independent digital segment U are deleted from the computer memory. In step 370, the secret-dependent digital segment is stored in a storage place of a persistent memory.

FIG. 4 shows the operations in the recovery and validation. In step 410, a password entry is received as the input. In step 420, the secret-independent digital segment is computed from the input by the same first transformation function as that adopted in FIG. 3, i.e. U=MD5(password)+β. In step 430, the secret-dependent digital segment is retrieved from its storage place. In step 440, the protected private key S is recovered by the third transformation function, i.e. S=$f_3$(V, S)=($\alpha^{-1}$V+(−(($\alpha^{-1}$U) mod q)) mod q) mod q. This completes the recovery process.

The challenge-and-response validation begins at step 450 where a random message C is obtained as a challenge. In step 460, the message fingerprint of C is signed using the recovered private key as the signature private key: SIG=signature (the recovered private key, hash(C)). In step 470, the signature so obtained is decrypted using the public key associated with the authentic private-key; the result is denoted as D: D=decryption(Public Key, SIG). In step 480, D and hash(C) are compared. The recovered private key is accepted in step 490 if the comparison results in a match. In step 498, the recovered secret is put in use in security services and is then deleted from the computer memory. If the comparison at step 480 does not find a match, the recovered private key is rejected in step 495. The process repeats itself after step 495.

The recovery with subsequent validation process described in FIG. 4 can be carried out in different system configurations. For example, a non-specified client computer capable of receiving the secret-dependent digital segment and the public key from a portable storage device may be used to perform the operations in FIG. 4. For another example, a portable client processor with persistent memories may also be used to store the secret-dependent digital segment and the public key and to carry out the recovery and validation.

Only a few examples and implementations are described. However, various enhancements, variations, and modifications are possible based on what is described here.

What is claimed is the techniques and systems as described and shown, including:

1. A method for protecting a digital secret, comprising:
transforming a user-selected password, which is independent of a digital secret to be protected, into a temporary value by a first transformation;
using the temporary value and the digital secret as inputs to a second transformation to produce a secret-dependent digital segment in a transitory memory;
storing the secret-dependent digital segment in a persistent memory;
deleting the secret-dependent digital segment from the transitory memory;
deleting the digital secret and the temporary value from each memory associated with computations of the first and second transformations;
receiving a password and a secret-dependent segment from a user requesting the recovery of the digital secret;
without a prior validation of the received password, using the received password and the received secret-dependent digital segment as inputs to a third transformation to compute a value as a recovered secret;
validating the recovered secret with verification information that has a relationship with the digital secret; and
determining whether the received password matches the selected password and whether the received secret-dependent digital segment matches the secret-dependent digital segment according to an outcome of the validating step,
wherein the first and second transformations are configured, respectively, as a first function $f_1$ and a second function $f_2$, and the third transformation is configured as a composite function of the first function $f_1$ and a third function $f_3$ in the sequence of computing $f_1$ first and subsequently computing $f_3$, and
wherein the first, the second, and the third functions are as follows:
(1) U=$f_1$(password)=hash(password)+β, where hash( ) is a collision-resistant hash function producing a positive integer for all instances of the password and β is a constant non-negative integer;
(2) V=$f_2$(U, S)=(U+α×S) mod q, where U is an input value representing an output instance produced by the function $f_1$, S is a positive integer representing an instance of the digital secret, q is a positive integer larger than all instances of the digital secret and also larger than hash (password) for all instances of the password, α is a positive integer relatively prime to q; and
(3) S=$f_3$(U, V)=($\alpha^{-1}$×V+((−($\alpha^{-1}$×U mod q)) mod q)) mod q, where U is an input value representing an output instance produced by the function $f_1$, V is an input value representing an instance of the secret-dependent digital segment, q is the sufficiently large integer as defined in $f_2$, α is also as defined in $f_2$, and $\alpha^{-1}$ is the multiplicative inverse of α, modulo q.

2. The method as in claim 1, further comprising using a cryptographic key as at least part of the digital secret.

3. The method as in claim 2, wherein the cryptographic key is a key in a symmetric cryptographic system.

4. The method as in claim 2, wherein the cryptographic key is a private key of a key pair of a public key and the private key.

5. The method as in claim 1, further comprising using an identification code for access to a secured information system as at least part of the digital secret.

6. The method as in claim 1, further comprising:
performing the first and the second transformations in a computer system to which the persistent memory is connected to receive and store the secret-dependent digital segment; and
upon completion of the second transformation and storing the secret-dependent digital segment, disconnecting the persistent memory from the computer system.

7. The method as in claim 1, further comprising selecting a collision-free mapping function to compute the first transformation.

8. The method as in claim 1, further comprising selecting a collision-resistant hash function to compute the first transformation.

9. The method as in claim 1, further comprising:
configuring the first and second transformations as a first function $f_1$ and a second function $f_2$, respectively, such that a composite transformation by first computing the function $f_1$ and subsequently computing the function $f_2$, for a given digital secret and expressed as
$f_2(f_1(\text{input data}), \text{the given digital secret})$,
is one of a collision-free mapping function and a collision-resistant hash function with respect to the input data in $f_1(\text{input data})$.

10. The method as in claim 1, further comprising using a portable storage device as the persistent memory to store the secret-dependent digital segment.

11. The method as in claim 10, wherein the portable storage device comprises a digital processor, and wherein the method further comprising performing the first and the second transformations on the digital processor.

12. The method as in claim 11, further comprising:
receiving a password from a user requesting the recovery of the digital secret;
retrieving the secret-dependent segment;
without a prior validation of the received password, using the received password and the retrieved secret-dependent digital segment as inputs to a third transformation to compute a value as a recovered secret;
performing the third transformation on the digital processor.

13. The method as in claim 10, wherein the portable storage device comprises a digital processor, and wherein the method further comprising:
receiving a password from a user requesting the recovery of the digital secret;
retrieving the secret-dependent segment;
without a prior validation of the received password, using the received password and the retrieved secret-dependent digital segment as inputs to a third transformation to compute a value as a recovered secret;
performing the third transformation on the digital processor.

14. The method as in claim 1, further comprising avoiding storing the selected password and a derivative of the selected password other than the secret-dependent digital segment in a persistent memory.

15. A method for protecting a digital secret, comprising:
accepting a digital secret as a protection object;
combining a selected password from an authorized user and a device-specific code from a device into a selected input;
transforming the selected input into a temporary value by a first transformation;
using the digital secret and the temporary value as inputs to a second transformation to produce a secret-dependent digital segment in a persistent memory of the device; and
deleting the digital secret and the temporary value from each memory associated with the computations of the first and second transformations, wherein the first and the second transformations are:
(1) the first transformation is $U=f_1(\text{password})=\text{hash}(\text{password})+\beta$, where hash( ) is a collision-resistant hash function producing a positive integer for all instances of the password and $\beta$ is a constant non-negative integer; and
(2) the second transformation is $V=f_2(U, S)=(U+\alpha \times S)$ mod q, where U is an input value representing an output instance produced by the function $f_1$, S is a positive integer representing an instance of the digital secret, q is a positive integer larger than all instances of the digital secret and also larger than hash(password) for all instances of the password, $\alpha$ is a positive integer relatively prime to q.

16. The method as in claim 15, further comprising avoiding storing the selected password and a derivative of the selected password other than the secret-dependent digital segment in a persistent memory.

17. The method as in claim 15, wherein the selected password and the device-specific code are combined as a concatenated bit string of data bits of the selected password and the device-specific code in either one of a first order where data bits for the selected password are before data bits from the device-specific code and a second order where data bits for the selected password are after data bits from the device-specific code.

18. The method as in claim 15, further comprising:
receiving a password from a user requesting the recovery of the digital secret;
accessing the device to obtain the device-specific code;
combining the received password and the obtained device-specific code into a received input;
transforming the received input into a temporary value by the first transformation;
retrieving the secret-dependent digital segment from the persistent memory of the device; and
without a prior validation of the received password, using the temporary value and the retrieved secret-dependent digital segment as inputs to a third transformation to compute a value as a recovered secret.

19. The method as in claim 18, wherein the device comprises a digital processor.

20. The method as in claim 19, further comprising restricting the computation of the first transformation to the digital processor.

21. The method as in claim 15, wherein the device is portable.

22. A method for protecting a digital secret, comprising:
transforming a personalized input into a secret-independent digital segment according to a first transformation function, wherein a content of the personalized input is independent of the digital secret;
using the secret-independent digital segment and the digital secret as inputs to a second transformation function to produce a secret-dependent digital segment which digitally conceals the digital secret, wherein a third transformation function exists to use the secret-independent digital segment and the secret-dependent digital segment as inputs for recovering the digital secret;
storing the secret-dependent digital segment in a persistent memory;
deleting the digital secret and the secret-independent digital segment from each memory associated with computations of the first and second transformation functions;
requesting a user who initiates the recovery to provide (1) the personalized input and (2) the secret-dependent digital segment for recovering the concealed digital secret; and
applying the computation of the third transformation function from a first input from the user in response to the request for the secret-independent digital segment and a second input from the user in response to the request for the secret-dependent digital segment to produce an output to the user, wherein the output reveals the digital secret to the user only when both the first input matches personalized input and the second input matches the secret-dependent digital segment, wherein the first, the second, and the third transformation functions are:

(1) the first transformation function $U=f_1(\text{password})=\text{hash}(\text{password})+\beta$, where hash( ) is a collision-resistant hash function producing a positive integer for all instances of the password and $\beta$ is a constant non-negative integer;

(2) the second transformation function $V=f_2(U, S)=(U+\alpha \times S) \mod q$, where U is an input value representing an output instance produced by the function $f_1$, S is a positive integer representing an instance of the digital secret, q is a positive integer larger than all instances of the digital secret and also larger than hash(password) for all instances of the password, $\alpha$ is a positive integer relatively prime to q; and (3) the third transformation $S=f_3(U, V)=(\alpha^{-1} \times V+((-(\alpha^{-1} \times U \mod q)) \mod q)) \mod q$, where U is an input value representing an output instance produced by the function $f_1$, V is an input value representing an instance of the secret-dependent digital segment, q is the sufficiently large integer as defined in $f_2$, $\alpha$ is also as defined in $f_2$, and $\alpha^{-1}$ is the multiplicative inverse of $\alpha$, modulo q.

23. The method as in claim 22, wherein the digital secret comprises a cryptographic key.

24. The method as in claim 23, wherein the cryptographic key is a key in a symmetric cryptographic system.

25. The method as in claim 23, wherein the cryptographic key is a private key of a key pair of a public key and the private key.

26. The method as in claim 22, wherein the digital secret comprises an identification code for access to a secured information system.

27. The method as in claim 22, wherein the personalized input comprises passwords, unique identifiers, location identification data, device identification codes, randomly-generated numbers, or a combination of these data.

28. The method as in claim 22, further comprising:
after the computation of the third transformation function, performing a validation process to verify the output of the computation.

29. The method as in claim 28, wherein the validation uses verification information that has a relationship with the digital secret.

30. An article comprising a machine-readable medium that stores machine-executable instructions for protecting a digital secret, the instructions causing a machine to:
transform a user-selected password, which is independent of a digital secret to be protected, into a temporary value by a first transformation;
use the temporary value and the digital secret as inputs to a second transformation to produce a secret-dependent digital segment in a transitory memory;
store the secret-dependent digital segment in a persistent memory;
delete the secret-dependent digital segment from the transitory memory;
delete the digital secret and the temporary value from each memory associated with computations of the first and second transformations;
receive a password and a secret-dependent segment from a user requesting the recovery of the digital secret;
without a prior validation of the received password, use the received password and the received secret-dependent digital segment as inputs to a third transformation to compute a value as a recovered secret;
validate the recovered secret with verification information that has a relationship with the digital secret; and
determine whether the received password matches the selected password and whether the received secret-dependent digital segment matches the secret-dependent digital segment according to an outcome of the validating operation,
wherein the first and second transformations are configured, respectively, as a first function $f_1$ and a second function $f_2$, and the third transformation is configured as a composite function of $f_1$ and a third function $f_3$ in the sequence of computing $f_1$ first and subsequently computing $f_3$, and
wherein the first, the second, and the third functions are as follows:

(1) $U=f_1(\text{password})=\text{hash}(\text{password})+\beta$, where hash( ) is a collision-resistant hash function producing a positive integer for all instances of the password and $\beta$ is a constant non-negative integer;

(2) $V=f_2(U, S)=(U+\alpha \times S) \mod q$, where U is an input value representing an output instance produced by the first function $f_1$, S is a positive integer representing an instance of the digital secret, q is a positive integer larger than all instances of the digital secret and also larger than hash(password) for all instances of the password, $\alpha$ is a positive integer relatively prime to q; and (3) $S=f_3(U, V)=(\alpha^{-1} \times V+((-((\alpha^{-1} \times U) \mod q)) \mod q)) \mod q$, where V is an input value representing an instance of the secret-dependent digital segment, U, q, and $\alpha$ are as defined in $f_2$, and $\alpha^{-1}$ is the multiplicative inverse of $\alpha$, modulo q.

31. A computer system, comprising:
means for transforming a personalized input into a secret-independent digital segment according to a first transformation function, wherein a content of the personalized input is independent of the digital secret;
means for using the secret-independent digital segment and the digital secret as inputs to a second transformation function to produce a secret-dependent digital segment which digitally conceals the digital secret, wherein a third transformation function exists to use the secret-independent digital segment and the secret-dependent digital segment as inputs for recovering the digital secret;
means for accessing a persistent memory to store the secret-dependent digital segment;
means for removing the secret-dependent digital segment from the computer system; and
means for deleting the secret-independent digital segment and the digital secret from the computer system after completing computations of the first and second transformation functions, wherein the first, the second, and the third transformation functions are:

(1) the first transformation function $U=f_1(\text{password})=\text{hash}(\text{password})+\beta$, where hash( ) is a collision-resistant hash function producing a positive integer for all instances of the password and $\beta$ is a constant non-negative integer;

(2) the second transformation function $V=f_2(U, S)=(U+\alpha \times S) \mod q$, where U is an input value representing an output instance produced by the function $f_1$, S is a positive integer representing an instance of the digital secret, q is a positive integer larger than all instances of the digital secret and also larger than hash(password) for all instances of the password, $\alpha$ is a positive integer relatively prime to q; and (3) the third transformation $S=f_3(U, V)=(\alpha^{-1} \times V+((-(\alpha^{-1} \times U \bmod q)) \bmod q)) \bmod q$, where U is an input value representing an output instance produced by the function $f_1$, V is an input value representing an instance of the secret-dependent digital segment, q is the sufficiently large integer as defined in $f_2$, $\alpha$ is also as defined in $f_2$, and $\alpha^{-1}$ is the multiplicative inverse of $\alpha$, modulo q.

32. The computer system as in claim 31, further comprising:
means for requesting a user who initiates the recovery to provide (1) the personalized input and (2) the secret-dependent digital segment for recovering the concealed digital secret; and means for computing the third transformation function from a first input from the user in response to the request for the secret-independent digital segment and a second input from the user in response to the request for the secret-dependent digital segment to produce an output to reveal the digital secret to the user only when both the first input matches personalized input and the second input matches the secret-dependent digital segment.

33. The computer system as in claim 32, further comprising:
means for performing a validation process to verify the output of the computation after the computation of the third transformation function, wherein the validation uses verification information that has a relationship with the digital secret.

* * * * *